United States Patent [19]

Boedo et al.

[11] Patent Number: 5,122,099
[45] Date of Patent: Jun. 16, 1992

[54] TWO-SPEED PLANETARY FRICTION ACCESSORY DRIVE

[75] Inventors: Stephen Boedo; Romas B. Spokas, both of Ithaca, N.Y.

[73] Assignee: Borg-Warner Automotive, Inc., Sterling Heights, Mich.

[21] Appl. No.: 680,452

[22] Filed: Apr. 4, 1991

[51] Int. Cl.⁵ ............................................. F16H 13/14
[52] U.S. Cl. .................................... 475/187; 475/185
[58] Field of Search ...................... 475/183, 185, 187

[56] References Cited

U.S. PATENT DOCUMENTS

| | | | |
|---|---|---|---|
| 3,160,031 | 12/1964 | Bugg | 475/183 X |
| 3,630,102 | 12/1971 | Larsen | 475/187 X |
| 4,080,843 | 3/1978 | Underwood | 74/336 |
| 4,854,192 | 8/1989 | Churchill et al. | 74/752 |
| 4,862,770 | 9/1989 | Smith | 74/789 |

FOREIGN PATENT DOCUMENTS 0620976  4/1949  United Kingdom ................ 475/187

OTHER PUBLICATIONS

"Sizing Criteria for Traction Drives", by D. A. Rohn, S. H. Loewenthal and J. J. Coy, NASA Advanced Power Transmission Technical Report 82-C-16, dated Jun. 9-11, 1981.
"Multiroller Planetary Friction Drives", SAE Paper 660763, Oct. 1966, by A. L. Nasvytis.

*Primary Examiner*—Dirk Wright
*Attorney, Agent, or Firm*—Brooks & Kushman

[57] ABSTRACT

A planetary friction roller drive (30, 66, 84, 26) adapted particularly for use in driving automotive accessories such as an alternator wherein provision is made for delivering engine torque to the ring roller element (26) of the planetary friction drive and for connecting drivably the sun roller element (30) of the friction drive to a driven accessory such as an alternator and wherein a torque flow path characterized by two speed ratios is effected by a compound planetary carrier assembly (50) as a preload at the friction drive contact locations between the planetary rollers (66, 84) and the ring roller element (30) and between the planetary rollers (66, 84) and the sun roller element (30) of the planetary assembly is established by a preload spring (134) actng in a tangential direction, the reaction torque for the planetary friction drive being established by a selectively engageable brake (136) acting on the sun roller element (30) thus effecting a ratio transition from unity.

3 Claims, 8 Drawing Sheets

TWO-SPEED PLANETARY FRICTION ACCESSORY DRIVE

BACKGROUND OF THE INVENTION

In vehicle accessory drives for use with an automotive internal combustion engine, it is desirable to establish a multiple ratio driving connection between an engine driven element and an engine driven accessory such as an alternator. Thus, it is possible to drive the alternator with a reduced speed ratio when the engine speed is high and at a higher speed ratio when the engine speed is low.

Internal combustion engines are characterized by a wide range of engine speeds throughout the normal driving cycle. The engine driven accessory, such as the alternator, thus must be designed for the required capacity when the vehicle engine speed is low. If a fixed ratio drive exists between the engine driven accessory and the engine, the accessory speeds will be excessive for the design capacity of the accessory when the engine speed increases. This tends to create an undesirable parasitic power loss.

I am aware of various two-speed accessory drives that are intended to increase the speed ratio at low engine speeds relative to the speed ratio that exists at high engine speeds. These include friction belt drives such as the crankshaft pulley and clutch system of U.S. Pat. No. 4,080,843, which discloses an accessory that is driven directly by the crankshaft from idle speed to a predetermined speed level. A suitable clutch arrangement is used to establish a reduced accessory speed relative to the crankshaft speed during operation of the engine at high speeds. Slipping clutch members are used between the crankshaft and the accessory drive pulley to provide a time interval of substantially constant accessory rpm during which the crankshaft is released from the torque input shaft for the accessory as the camshaft becomes drivably connected to the accessory through a one-way clutch. The camshaft, of course, is driven at one-half the engine crankshaft speed.

I am aware also of geared two-speed accessory drives for use in establishing a geared torque flow path between an engine driven pulley and the accessories. Examples are shown in U.S. Pat. No. 4,854,192 and U.S. Pat. 4,862,770. In the case of prior art '770 patent, an engine driven pulley is connected to an accessory drive shaft through a planetary arrangement comprising two epicyclic differential diameter gears and a pair of sun gears of unequal pitch diameter. The torque reaction for the two-speed accessory drive is obtained by a brake band encircling a brake drum connected to the carrier. Such two-speed accessory drives generally exhibit undesirable gear noises and lack economy of space within the engine compartment of an automotive vehicle. Furthermore, they are difficult to manufacture, and often are costly and thus are not commercially feasible for large volume automotive vehicle uses.

BRIEF DESCRIPTION OF THE INVENTION

We have provided an improved two-speed accessory drive for automotive engine applications by employing a simple planetary friction drive characterized by a high degree of mechanical efficiency and design simplicity. Our invention is adapted for use with an internal combustion engine in a vehicle engine compartment wherein the input shaft for a vehicle engine accessory, such as an alternator, is connected by means of a two-speed torque flow path to a crankshaft-driven belt and pulley arrangement. The reaction element for the two-speed accessory drive is a brake band which, when applied, causes the output shaft speed for the accessory drive to become greater than the input shaft speed. When the brake band is disengaged, the friction drive elements of the two-speed accessory drive become locked together for rotation in unison through the action of the overrunning coupling, and the output speed of the two-speed accessory drive becomes equal to the input shaft speed.

A compression spring is used to apply a normal force to the friction elements so that the traction limit is never exceeded throughout the useful torque range for the drive. If the traction limit were to be exceeded, the rollers would slip, producing excessive heat, low efficiency and bearing failure.

We are aware of multi-roller planetary friction drives wherein a ring element is drivably connected to a sun element by means of planetary elements journalled on a planetary carrier. One or more planetary elements in the form of cylindrical friction rollers engage the internal friction driving surface of the ring element. Friction contact is established also between the sun element and the planetary friction elements. It is known also in the art to provide either compound planetary elements or simple planetary elements, depending upon the torque ratio and the torque delivery direction that are desired. Examples of friction drives of this kind may be seen in SAE Paper No. 660763, entitled "Multi-roller Planetary Friction Drives", by Algirdas L. Nasvytis.

We have incorporated in our invention many of the desirable characteristics of such known multi-roller planetary friction drives and known geared two-speed accessory drives. Our invention is distinguishable from those known friction drives, however, because we have provided a two-speed accessory drive in which the preload forces on the friction elements may be controlled, thereby establishing a desired torque capacity for the drive. Furthermore, our improved drive eliminates the necessity for using friction elements having a preload that depends upon the elastic deformation of the elements. This eliminates many of the manufacturing problems associated with maintenance of close tolerances and fits. Our drive also is less sensitive to temperature changes of the lubricant in which the friction elements operate. The preload is not dependent upon the coefficient of thermal expansion of the material of which the friction elements are made, nor on the temperature of the lubricant.

Our two-speed accessory drive operates with substantially less noise compared to a geared drive. Further, the cost of manufacturing the roller elements is substantially less than the cost of manufacturing a corresponding two-speed accessory drive with gears.

Another advantage of our improved friction roller, two-speed accessory drive, aside from the reductions in noise and cost, is the increase in durability in comparison to a geared drive. This is due in part to the lack of axial thrust that normally is present in a geared two-speed accessory drive. The thrust is created by the helical gear tooth forces. If an attempt were to be made to eliminate the gear tooth thrust forces in a geared two-speed accessory drive by designing the drive with straight teeth, gear noise would be substantially increased.

Another feature of our invention that distinguishes it from geared two-speed accessory drives of the kind shown, for example, in the '770 patent is its economy of space, particularly in an axial direction. Our improved design also makes any out-of-concentricity tolerance more acceptable than a corresponding out-of-concentricity in a geared two-speed accessory drive. This is due in part to the automatic tolerance take-up and spring preload that is applied continuously to the planetary friction elements of our drive.

Lubrication of the friction elements of our drive is simplified by reason of the fact that the planetary ring gear and the carrier for the planetary friction elements is continuously rotating whenever the engine is in operation. This makes it possible for the planetary friction elements to operate in cooperation with a lubrication oil sump containing lubricating oil that may be applied to the friction elements and bearings to maintain continuous lubrication. In contrast, the gear drive of the '770 patent, for example, does not include a continuously rotating element corresponding to the ring element and the planetary friction elements of our invention because the carrier for the planetary gears of the drive of the '770 patent is braked during one operating mode of the drive. Thus, lubrication flow in that prior art design must be directed to the elements of the drive by some other means, such as an auxiliary pump and lubrication circuit.

In our improved design, the tangential spring force is applied to one element of a compound planetary friction drive assembly, thus establishing a continuous preload on all of the planetary friction drive elements including the ring element and the sun element. The spring compression force applies a sufficient normal force to the rollers so that the friction traction limit is never exceeded throughout the torque range of the device. Torque reaction is achieved by anchoring the carrier element by means of a brake band that is applied by a vacuum actuator or by some other suitable brake operating servo. When the brake is disengaged, an overrunning coupling establishes a driving connection between the carrier and the sun gear, thus creating a one-to-one driving relationship. When the brake is applied, the carrier element acts as a reaction point as the overrunning coupling freewheels.

BRIEF DESCRIPTION OF THE FIGURES OF THE DRAWING

FIG. 2 is an end view, partly in transverse cross-section, showing the planetary friction drive assembly of FIG. 1 as seen from the plane of section line 2—2 of FIG. 1.

PARTICULAR DESCRIPTION OF THE INVENTION

Figure 1:
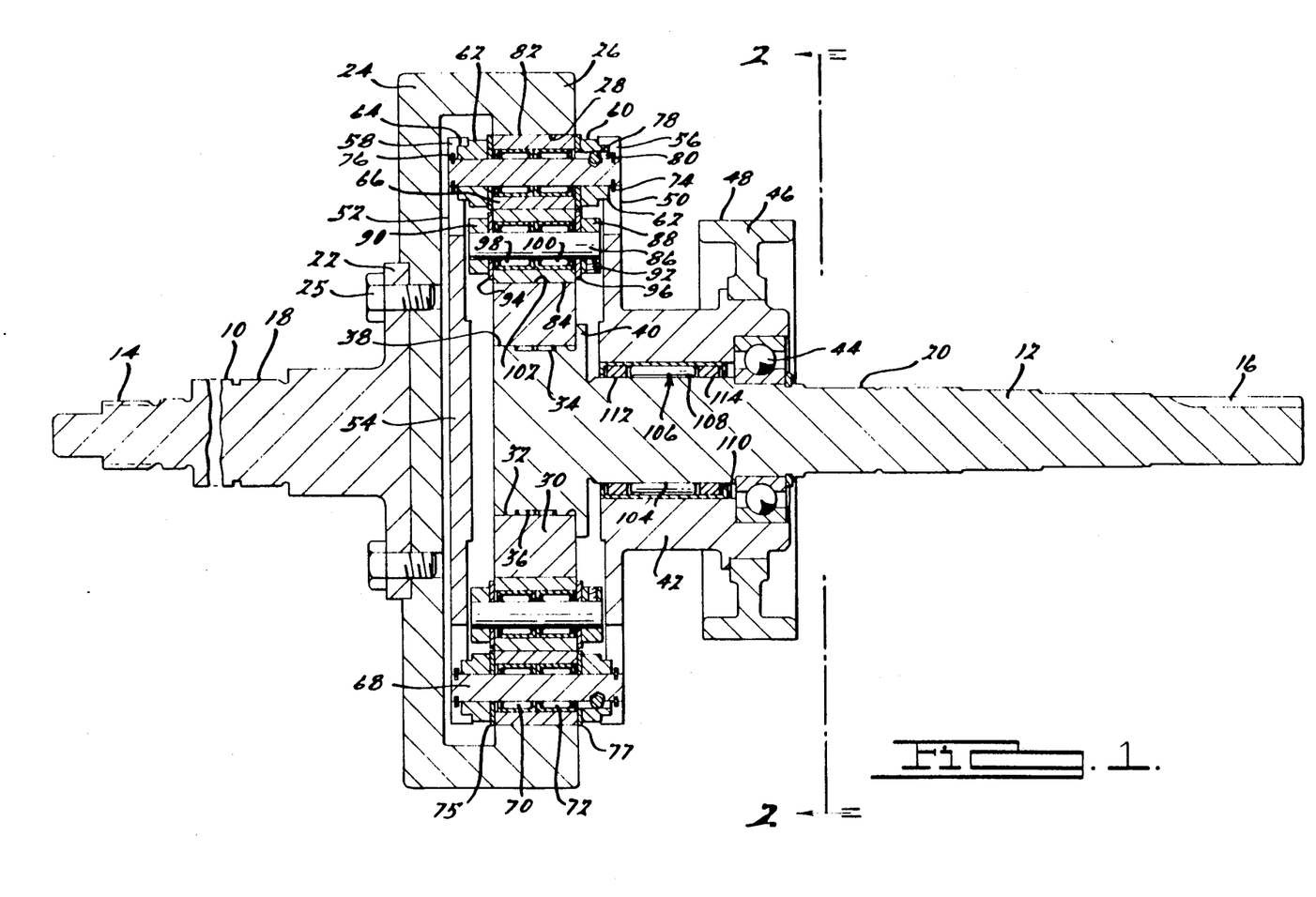
FIG. 1 is a longitudinal cross-sectional view of our improved planetary friction drive taken on a plane that contains the common axis of the input shaft and the output shaft.

In the cross-sectional view of FIG. 1, numeral 10 designates a torque input shaft, and numeral 12 designates a torque output shaft. The shafts are coaxially aligned. The input shaft is provided with a spline 14 to facilitate a driving connection with the drive pulley or some other suitable source of torque. The outboard end of shaft 12 is splined at 16 to facilitate a driving connection with the torque input element of an accessory, such as an alternator for an automotive vehicle engine. The drive pulley for powering the torque input shaft may be the engine pulley system that is connected drivably to the engine crankshaft. A bearing surface 18 is provided on the shaft 10 to accommodate a support bearing for the shaft. Likewise, the shaft 12 is provided with a bearing portion 20 for accommodating a support bearing for the output shaft 12. The bearings associated with bearing portions 18 and 20 are carried by an accessory drive housing (not shown), the housing being supported by the vehicle engine.

The inboard end of shaft 10 is flanged at 22 to permit a driving connection with a ring roller housing 24, suitable bolts 25 being provided for this purpose.

The friction ring member 24 has a peripheral portion 26 formed with an internal friction surface 28 that is generally cylindrical in form. Radially disposed with respect to the annular surface 28 is a sun roller 30, which is secured to shaft 12 by means of a friction fit at surface 32. To assist in the driving frictional connection between sun roller 30 and shaft 12, we have provided a tolerance ring 34 seated in an annular recess 36 formed in the cylindrical surface 38 of the shaft 12. The tolerance ring is a corrugated spring steel strip located in the recess 36. It is compressed radially as the sun roller 30 is pressed on the surface 38 of the shaft 12, thus establishing a frictional driving connection between the sun roller 30 and the shaft 12. Tolerance rings of this kind are available commercially from General Sullivan Group Inc. of Sullivan Way, West Trenton, N.J. We contemplate that other means for drivably connecting the sun roller 30 to the shaft 12 may be used. Examples of possible alternative means include shrink fitting and press fitting.

The shaft 12 is provided with a locating shoulder 40 for axially positioning the sun roller 30 on the shaft 12.

A planet carrier hub 42 surrounds shaft 12 and is journalled rotatably on the shaft 12 by roller bearing 44. A brake drum 46 having a friction brake surface 48 surrounds the shaft 12 and is fixed to the planet carrier hub 42. The planet carrier has radially outwardly extending portions 50 and 52. Portion 52 forms a part of a planet carrier cover 54 situated between a friction ring portion 24 and the sun roller 30. Carrier portion 50 is formed with radial slots 56 and carrier portion 52 is formed with slots 58. An outer planet guide 60 has an extension 62 received in the slots 56. A corresponding outer planet guide 62 has an extension 64 received in slots 58.

Outer planet rollers 66 are supported by the planet carrier, but radial movement of roller 66 relative to the carrier is permitted. Each roller 66 is journalled on a pinion shaft 68 by means of axially spaced needle bearings 70 and 72. The pinion shaft is end supported in the planet guides 60 and 62. A snap ring is situated at each end of the pinion shafts 68 to axially position the pinion shaft relative to the guides 60 and 62, as shown at 74 and 76. Thrust washers 75 and 77 are located at the ends of each outer planet roller. A retaining ball 78 situated in a pocket formed in the pinion shaft 68 is adapted to register with an axially extending groove 80 in the guide 60, thus retaining the shaft 68 fast with respect to the guide 60 and the guide 62.

A frictional driving relationship is established between the friction surface 28 of the ring roller and the outer cylindrical surface of the roller 66, as seen at 82. The outer planet roller assembly is shown in more particular detail in FIG. 1b.

Figure 1A:
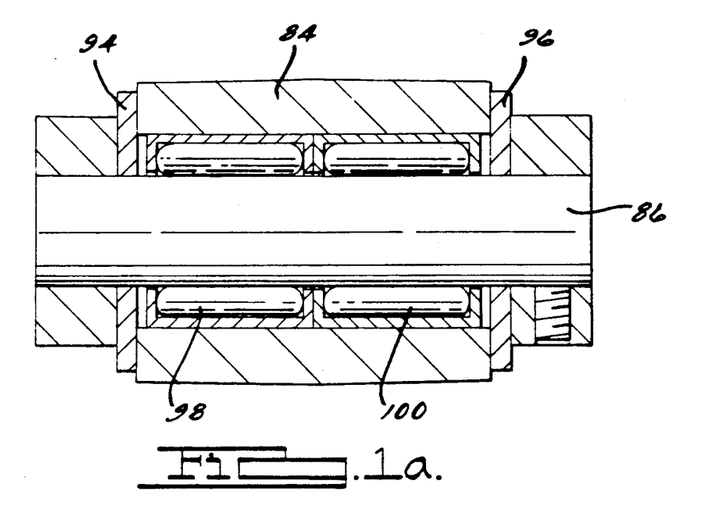
FIG. 1a is a detailed cross-sectional view of the inner planet and carrier assembly.
Figure 1B:
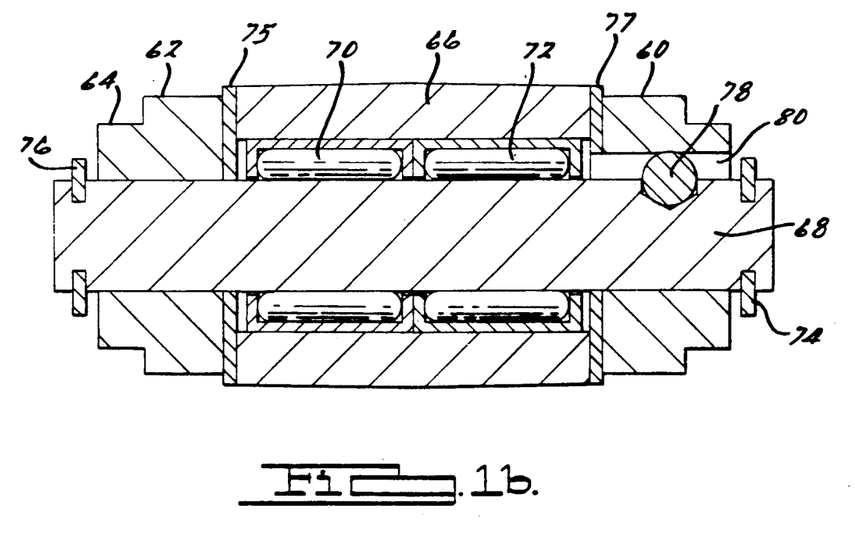
FIG. 1b is a detailed cross-sectional view of the outer planet and carrier assembly.
Figure 3:
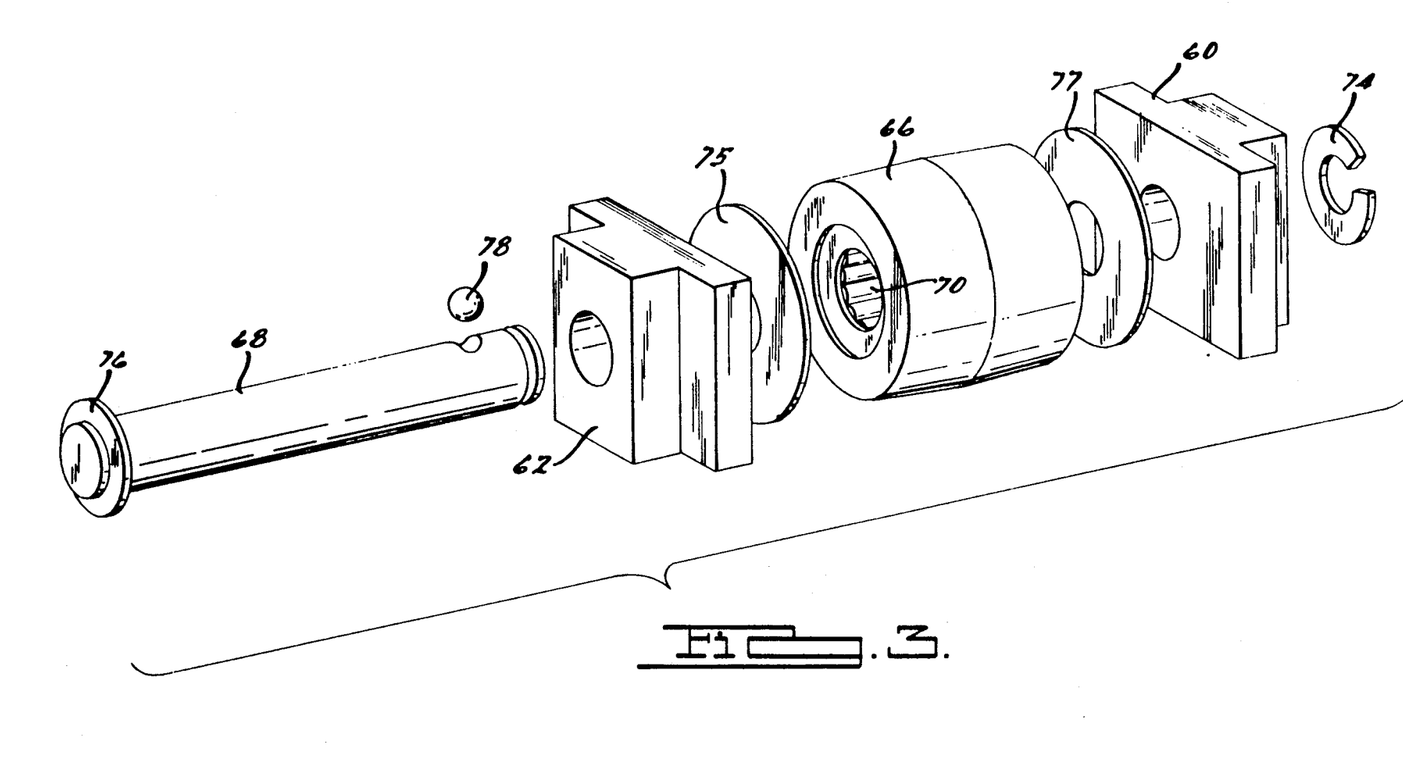
FIG. 3 is an exploded view of the outer planet assembly including the retainer ring, the outer planet guide, the outer planet roller and the thrust washers.

The inner planet roller assembly includes rollers 84, each of which is journalled on pinion roller shaft 86. Shaft 86 is end supported by an inner planet yoke having yoke arms 88 and 90. A set screw 92 threadably received in a threaded opening of the yoke arm 88 fixes the inner pinion roller shaft 86 with respect to the yoke. An inner planet thrust washer is situated on each axial end of the inner planet rollers 84 as shown at 94 and 96. Inner planet roller 84 is journalled on the shaft 86 by spaced needle roller bearings 98 and 100.

Inner planet rollers 84 frictionally engage the outer friction surface 102 of the sun roller 30. They engage also the outer friction surface 82 of the outer planet rollers 66.

The planet carrier hub 42 surrounds cylindrical surface 104 of an overrunning coupling 106. The coupling 106 includes one-way clutch roller elements 108 situated between cylindrical surface 104 and cam surfaces formed in the central opening 110 of the hub 42. Pilot bearings 112 and 114 are situated on each side of the rollers 108 and are held in place by a cage as shown in FIG. 1.

The outer planet guide and thrust washer 60 is guided within the slot 56 in the carrier 50 and the outer planet guide thrust washer 62 is guided in the slot 58 of the planet carrier cover 54. This is best seen in FIG. 2. The inner planet rollers 66 are journalled on shafts 86 and, as indicated best in FIG. 1a, thrust forces on the inner planet roller are accommodated by inner planet thrust washers 94 and 118.

Figure 4:
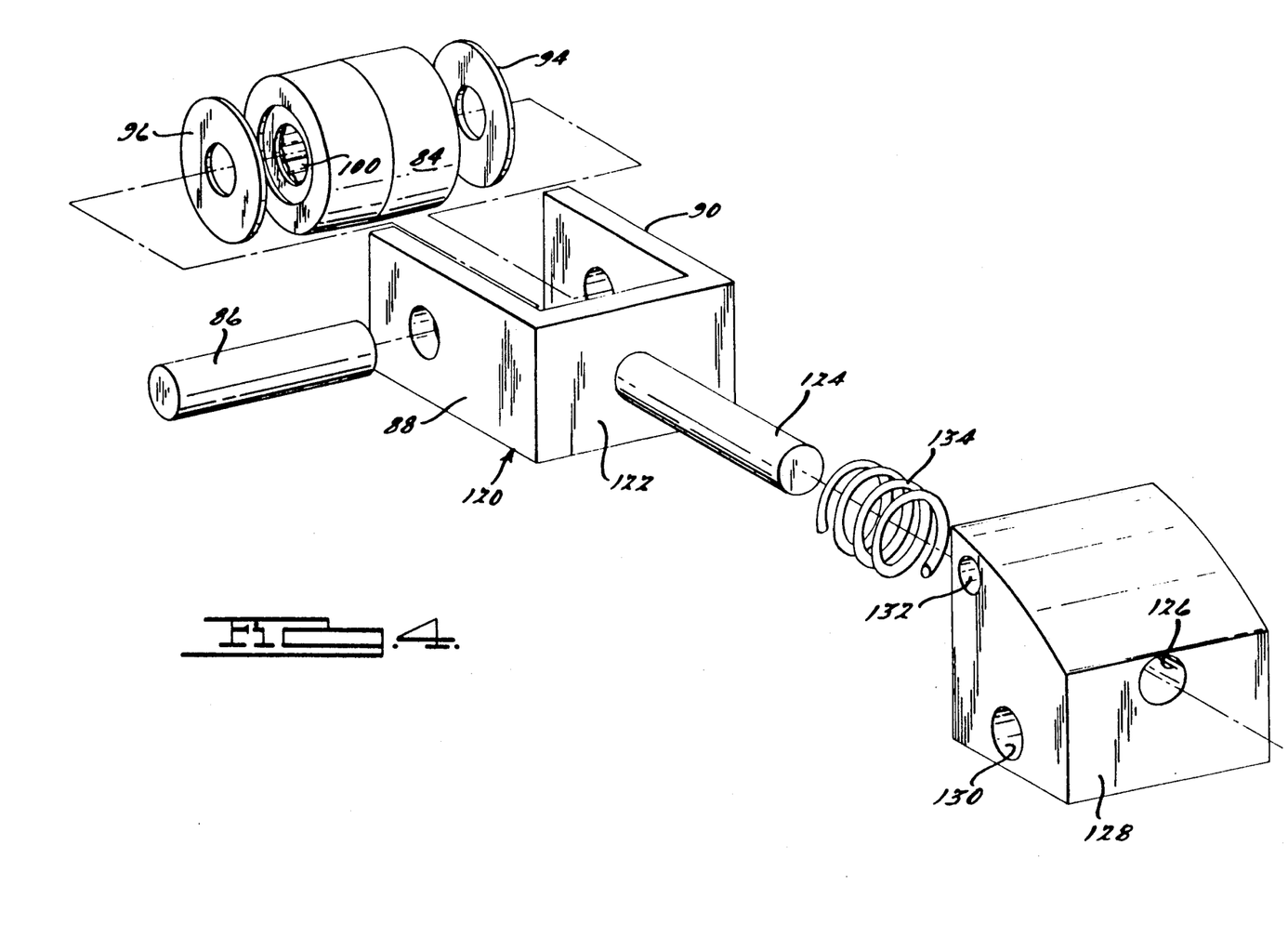
FIG. 4 is an exploded assembly view of the inner planet assembly including the inner planet roller, the inner planet yoke and planet shaft, the inner planet guide, the compression spring and the yoke reaction and separator block.

The yoke arms 88 and 90, as best seen in FIG. 4, form part of a yoke assembly 120. This assembly includes a transverse portion 122 and an inner planet yoke guide 124, the latter comprising a cylindrical element that is secured to the transverse portion 122 and which is received in a yoke guide hole 126 formed in yoke reaction block 128. The reaction block 128, as best seen in FIGS. 4 and 2, is provided with a pair of bolt holes 130 and 132 which receive clamping bolts that extend from radial portion 50 of the planet carrier to the planet carrier cover 54. Thus, the reaction block 128 acts as a separator block which forms a part of a carrier assembly when the bolts are in place. A compression spring 134 surrounds the inner planet yoke guide 124 and acts against the reaction block 128 as it urges the yoke and the inner planet roller 84 into frictional rolling engagement with respect to the sun roller 30 and the outer planet rollers 66.

A brake band 136 surrounds brake drum 46, as indicated in FIG. 2. Brake band 136 is a flexible metallic band that is anchored at one end 138 to an anchor pin 140 which forms a part of a brake band support bracket 142. A suitable attachment comprising bolts 144 secure the bracket 142 to a stationary rack and boss 146.

The active end 148 of the brake band 136 is connected to an actuator rod 150, which is connected to a vacuum motor actuator shaft 152 by a suitable pin connection 154. The vacuum motor comprises a housing 156, which defines a vacuum chamber which is in fluid communication with a vacuum source such as the engine intake manifold through a suitable conduit connected to a vacuum pressure fitting 158. A diaphragm within the housing 156 partly defines a vacuum chamber and is connected mechanically to member 152. Valve means (not shown) is adapted to selectively connect the vacuum motor to a vacuum pressure source to effect movement of the active end 148 of the brake band 136.

The brake drum rotates in a counterclockwise direction, as viewed in FIG. 2, so that the braking effort is self-energizing.

Figure 9:
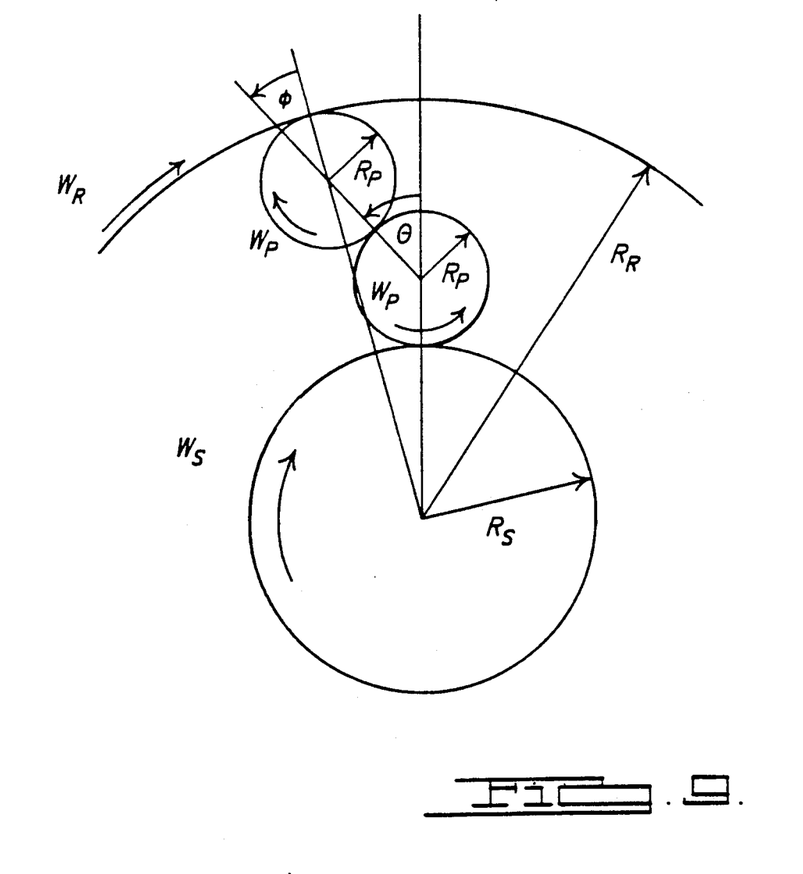
FIG. 9 is a diagram showing the traction drive geometry.

In FIG. 9, I have shown schematically the traction drive geometry including the geometric relationship of the outer pinion roller, the inner pinion roller, the sun roller and the ring roller. The sun roller radius carries the designation $R_S$. The ring radius carries the designation $R_R$. The pinion roller radii carry the symbol $R_P$.

As a tangential force is applied to the carrier for the inner pinion roller, the elements assume a position such as that shown in FIG. 9 where the angle $\Theta$ typically may be about 8°, and the angle $\Phi$ typically may be about 5°. The formulae for calculating these angles are set forth as follows:

$$\cos\Theta = \frac{(R_R - R_P)^2 - 4R_P^2 - (R_S + R_P)^2}{4R_P(R_S + R_P)} \quad \text{Equation 1}$$

$$\cos\Phi = \frac{4R_P^2 + (R_R - R_P)^2 - (R_S + R_P)^2}{4R_P(R_R - R_P)} \quad \text{Equation 2}$$

$$\sin\Theta = (1 - \cos^2\Theta)^{\frac{1}{2}},$$

$$\sin\Phi = (1 - \cos^2\Phi)^{\frac{1}{2}} \quad \text{Equation 3}$$

If it assumed that the brake band is engaged so that the planetary carrier is stationary and the overrunning clutch is freewheeling, the angular velocity of the sun gear and the angular velocity of the pinions are expressed respectively by the following equations:

$$W_S = \left(\frac{R_R}{R_S}\right) W_R \quad \text{Equation 4}$$

$$W_P = \left(\frac{R_R}{R_P}\right) W_R \quad \text{Equation 5}$$

When the brake band is applied, the carrier is held stationary by the brake band. A tangential friction force applied to the outer planet roller creates an equal and opposite tangential friction force on the inner planet roller. Similarly, a tangential friction force is developed at the friction contact line between the inner planet roller and the sun roller, which is in the same direction as the tangential force developed at the interface of the ring roller and the outer planet roller. The sun roller then is driven at a speed greater than the speed of the input shaft 10 as the overrunning coupling 106 freewheels. If the brake band is released, the reaction point between the carrier and the brake band is eliminated and the overrunning coupling 106 locks up, thereby causing the carrier and the sun roller to rotate together in unison, thus establishing a one-to-one drive ratio between the input shaft 10 and the output shaft 12.

Figure 7:
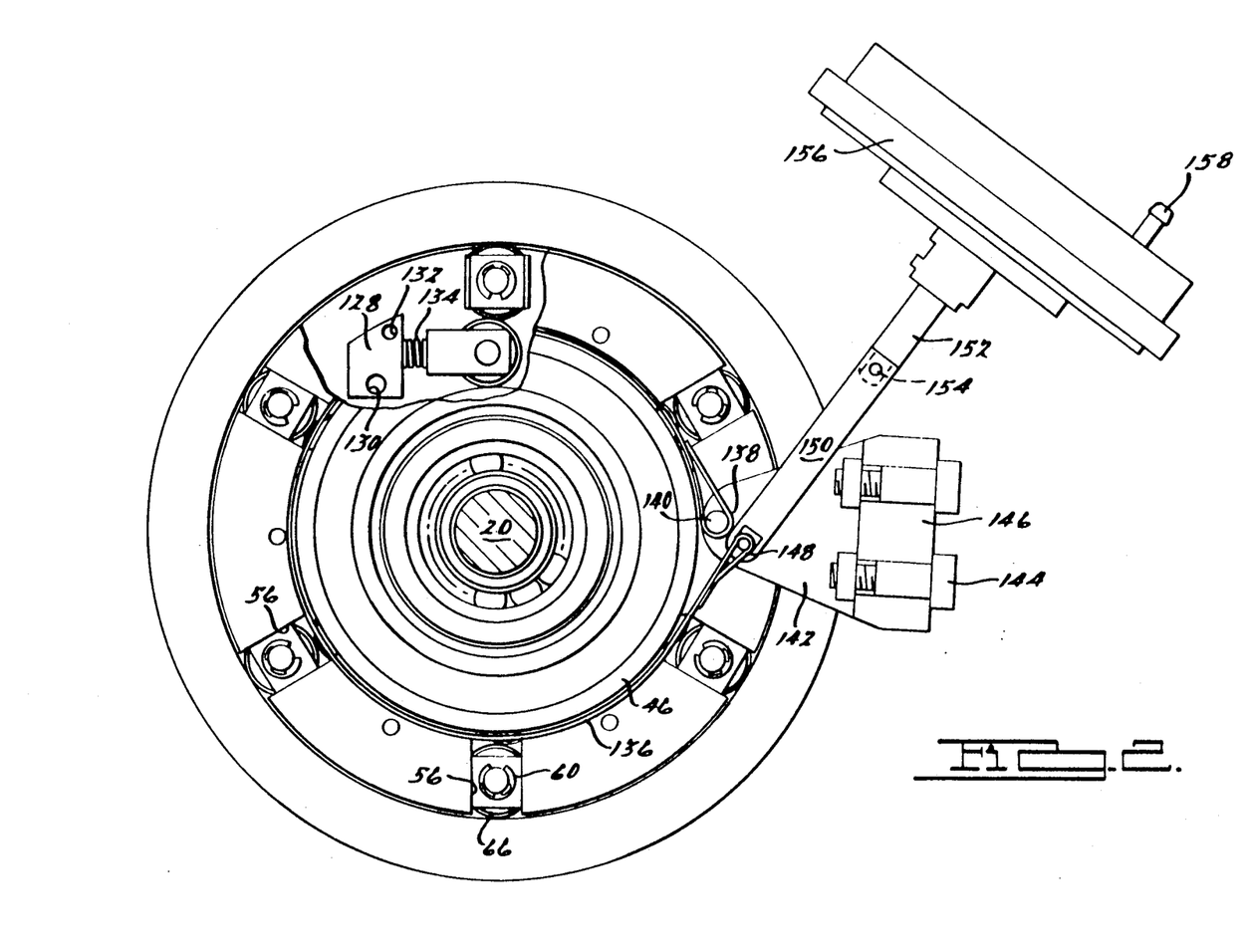
FIG. 7 is a free body force vector diagram of the roller ring when the reaction brake is applied.

When the brake band is applied, the traction dynamics for the ring roller are illustrated in FIG. 7, where the input torque to the ring roller is indicated by the symbol $T_{IN}$. The normal force acting on the ring roller by the outer planet roller carries the symbols $N_1$, and the resulting tangential friction force created by the contact between the ring roller and the outer planet roller is indicated by the symbol f.

Figure 8:
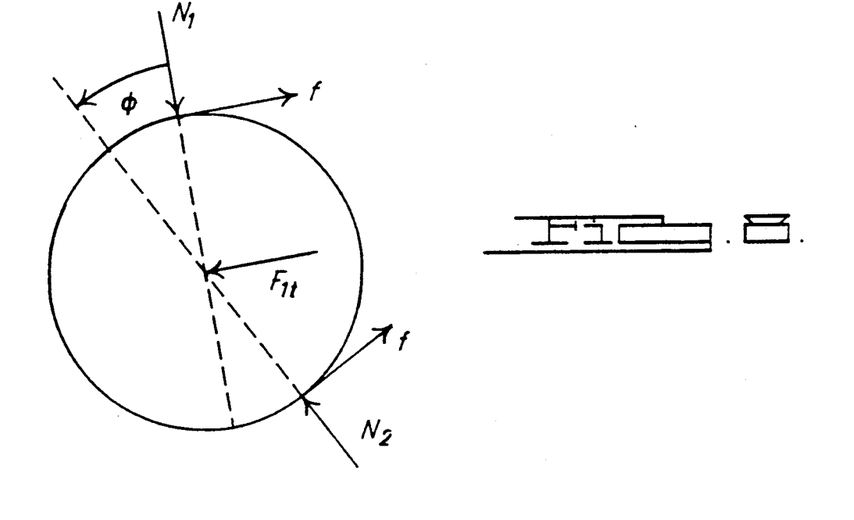
FIG. 8 is a free body force vector diagram for the outer planet when the reaction brake is applied.

The corresponding diagram showing the dynamics for the outer planet roller, when the brake is engaged, is shown in FIG. 8 where the normal force acting from the ring roller to the outer planet roller is designated by the symbol $N_1$, and the tangential friction force created by that force is shown by the symbol f. The vector $N_2$ indicates a normal force from the inner planet roller to the outer planet roller. The tangential force reaction from the planet carrier to the outer planet pinion roller is shown by the vector $F_{1t}$. Because of the requirement that the moment sum on the outer planet roller must be zero, the friction forces f are identical.

The relationship between the normal force acting from the ring to the outer planets, the normal force from the inner planet roller to the outer planet roller, and the friction force is expressed by the equation:

$$N_1 - N_2\cos\Phi - f\sin\Phi = 0 \qquad \text{Equation 6}$$

Similarly, the relationship between the angle $\Phi$, the friction force and the tangential reaction force from the planet carrier to the outer planet rollers is set forth as follows:

$$f\cos\Phi - N_2\sin\Phi - f - F_{1t} = 0 \qquad \text{Equation 7}$$

In the case of FIG. 7, the relationship between the input torque $T_{IN}$, the friction force f and the ring roller radius is set forth as follows:

$$T_{IN} = kfR_R. \qquad \text{Equation 8}$$

where k is the number of outer planet rollers.

In the case of FIG. 8, the relationship between the free body forces for the outer planet when the brake is engaged is expressed as follows:

$$N_1 - N_2\cos\Phi - f\sin\Phi = 0 \qquad \text{Equation 9}$$

$$f\cos\Phi - N_2\sin\Phi + f - F_{1t} = 0 \qquad \text{Equation 10}$$

The friction force in the foregoing equations is the force created due to the normal force $N_1$ acting from the outer planet roller to the ring roller. $N_2$ is the normal force from the inner planet to the outer planet, and $F_{1t}$ is the tangential reaction force from the planet carrier to the outer planet.

Figure 5:
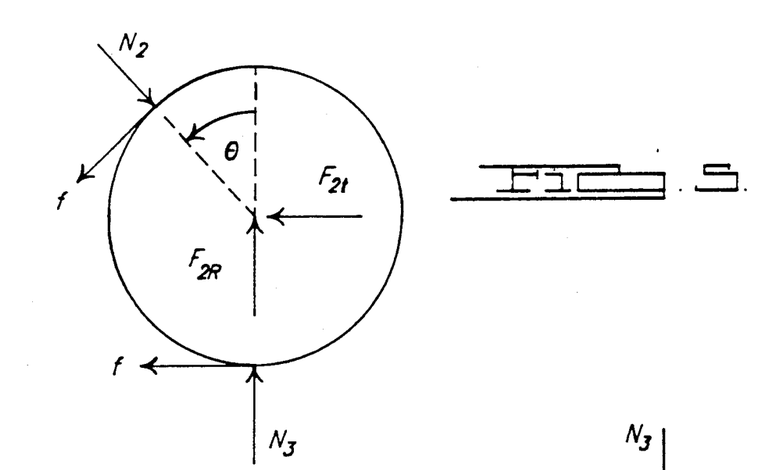
FIG. 5 is a diagram of the inner planet free body force vectors when the brake shown in FIG. 2 is applied.

The dynamics of the inner planet roller when the brake is engaged are illustrated in FIG. 5. The symbol $N_2$ in FIG. 5 is a normal force acting from the outer planet roller to the inner planet roller. The symbol f is the friction force acting in a tangential direction. The symbol $N_3$ is a normal force acting from the sun roller to the inner planet roller, and the symbols $F_{2t}$ and $F_{2R}$ designate the tangential and normal components, respectively, of the spring force applied to the inner planet rollers. The relationship between the angle $\Theta$ in FIG. 5, the normal force from the outer planet roller to the inner planet roller and the tangential component of the spring force acting on the inner planet rollers is expressed by the following equation:

$$-N_2\sin\Phi + f\cos\Phi + f + F_{2t} = 0 \qquad \text{Equation 11}$$

The relationship between the normal component of the spring force applied to the inner planet shaft, the normal force from the outer planet roller to the inner planet roller, and the normal force from the sun roller to the inner planet roller is expressed by the following equation:

$$F_{2R} - N_2\cos\Phi - f\sin\Phi + N_3 = 0 \qquad \text{Equation 12}$$

Figure 6:
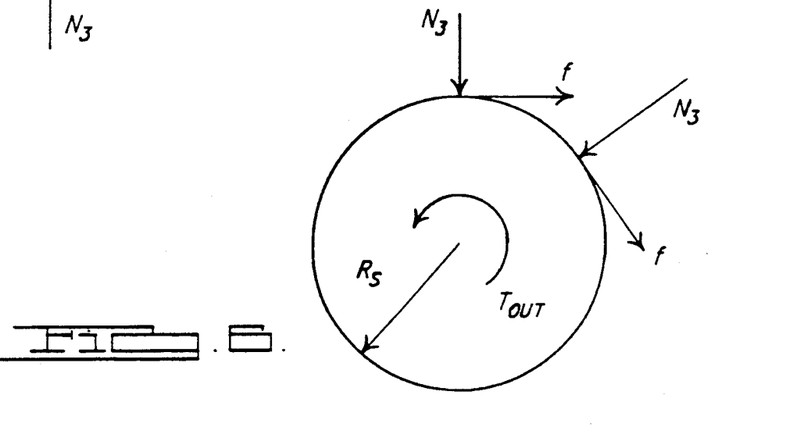
FIG. 6 is a diagram showing the sun roller free body force vectors when the reaction brake is applied.

FIG. 6 illustrates the dynamics of the sun roller when the brake is engaged. In FIG. 6, symbol f represents the friction force acting in a tangential direction, and $T_{OUT}$ is the reaction torque acting on the sun roller. $N_3$ is the normal force from the inner planet roller to the sun roller. The relationship between the friction force and the output torque is expressed by the equation:

$$KfR_S - T_{OUT} = 0. \qquad \text{Equation 13}$$

where k is the number of inner planet rollers.

Equations 13–18 in the following discussion represent the relationship between the six unknowns f, $N_1$, $N_2$, $N_3$, $F_{1t}$ and $T_{OUT}$ and the variables discussed above.

$$f = \frac{T_{in}}{kR_R} \qquad \text{Equation 14}$$

$$N_2 = \frac{1}{\sin\Theta}\left(\frac{T_{in}(1 + \cos\Theta)}{kR_R} + F_{2t}\right) \qquad \text{Equation 15}$$

$$N_3 = \frac{T_{in}}{kR_R}\sin\Theta + N_2\cos\Theta - F_{2R} \qquad \text{Equation 16}$$

$$F_{1t} = \frac{T_{in}}{kR_R}(1 + \cos\Phi) - N_2\sin\Phi \qquad \text{Equation 17}$$

$$T_{OUT} = \left(\frac{R_S}{R_R}\right)T_{in} \qquad \text{Equation 18}$$

$$N_1 = N_2\cos\Phi + \frac{T_{in}}{kR_R}\sin\Phi \qquad \text{Equation 19}$$

In the foregoing analysis, a constraint is imposed by the dynamic coefficient of friction. Specifically, the force f should be less than the minimum value for the coefficient of friction times $\mu$ times $N_1$, $\mu$ times $N_2$, and $\mu$ times $N_3$. That is, the traction coefficient $\mu$ times N, $\mu$ times $N_2$ and $\mu$ times $N_3$ must be greater than f. If any of the products of the dynamic coefficient of friction and any of the normal forces $N_1$, $N_2$, and $N_3$ is insufficient to accommodate a given tangential friction force f, the traction drive will slip.

If the brake is disengaged, a one-to-one driving relationship is established. As mentioned above, the equations 6-12 discussed previously remain the same during operation of the accessory drive with the brake disengaged.

Figure 10:
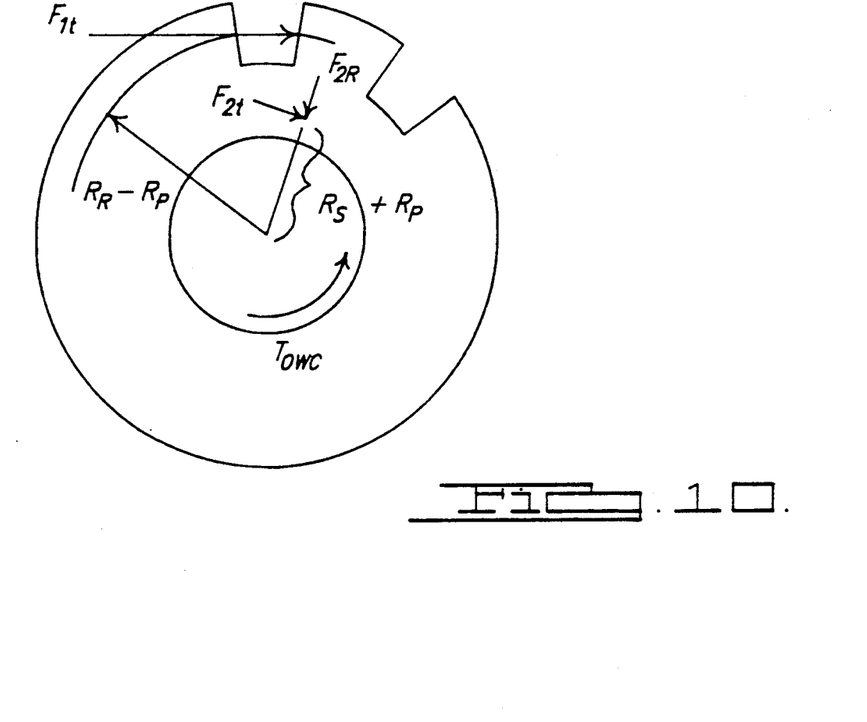
FIG. 10 is a diagram showing the forces acting on the planet carrier when the brake is disengaged.

The dynamics for the carrier are illustrated in FIG. 10 in the case of operation in the disengaged mode. $F_{1t}$ is a tangential reaction force from the outer planet roller to the planet carrier, and the symbol $F_{2t}$ represents the tangential component of the spring force acting on the carrier. $T_{OWC}$ is the torque distributed by the one-way clutch on the planet carrier. The torque balance on the carrier is expressed as follows:

$$F_{1t}(R_R-R_P)+F_{2t}(R_S+R_P)-T_{OWC}=0 \qquad \text{Equation 20}$$

Figure 11:
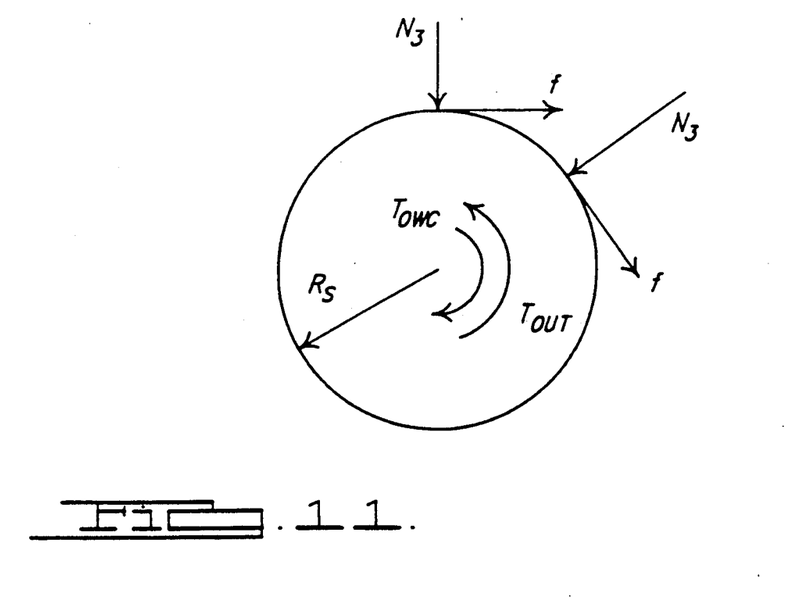
FIG. 11 is a diagram showing the forces acting on the sun roller when the reaction brake is disengaged.

FIG. 11 illustrates the dynamics for the sun roller during operation in the disengaged mode. The relationship between the tangential force, the torque distributed from the one-way clutch, and the output torque is expressed as follows:

$$kfR_S-T_{OWC}-T_{OUT}=0 \qquad \text{Equation 21}$$

The solutions for the seven unknowns f, $N_1$, $N_2$, $N_3$, $F_{1t}$, $T_{OWC}$ and $T_{OUT}$ are expressed in terms of $T_{IN}$, $F_{2R}$, and $F_{2t}$, as in the case of previously described equations 13-18, as follows:

$$f = \frac{T_{IN}}{kR_R} \qquad \text{Equation 22}$$

$$N_2 = \frac{1}{\sin\Theta}\left( \frac{T_{IN}(1 + \cos\Theta)}{kR_R} + F_{2t} \right) \qquad \text{Equation 23}$$

$$N_3 = \frac{T_{IN}}{kR_R}\sin\Theta + N_2\cos\Theta - F_{2R} \qquad \text{Equation 24}$$

$$F_{1t} = \frac{T_{IN}}{kR_R}(1 + \cos\Phi) - N_2\sin\Phi \qquad \text{Equation 25}$$

$$N_1 = N_2\cos\Phi + \frac{T_{IN}}{kR_R}\sin\Phi \qquad \text{Equation 26}$$

$$T_{OUT}=T_{IN} \qquad \text{Equation 27}$$

The torque accommodated by the overrunning coupling is expressed as follows:

$$T_{OWC} = T_{IN}\left(1 - \frac{R_S}{R_R}\right) \qquad \text{Equation 28}$$

In the case of equations 21-28, it is necessary that the tangential force f be less than the minimum force represented by the product of the static coefficient of friction $\mu$ times the normal forces $N_1$, $N_2$, or $N_3$. If the tangential force exceeds any of those values, the friction drive will slip.

The materials of which friction rollers are formed may be SAE 9310 steel or AISI-SAE 52100 steel. If SAE 9310 steel is chosen, its low carbon content would require carburizing or carbonitriting treatment to achieve a surface hardness of Rockwell C60. On the other hand, if the AISI-SAE 52100 steel is chosen, its high carbon content requires only standard heat treatment to a Rockwell hardness RC60. The other components of the drive may be formed of low carbon steel such as SAE 1020, cold rolled steel.

The steel used in the manufacture of the rollers may be produced using either vacuum or inert gas consumable electrode methods. This may involve the use of a vacuum arc remelting furnace or an electro-slag remelting furnace, both of which are well known in the art.

The surfaces for the rollers may be ground to a surface finish of about 2-8 micro-inches.

Typical coefficients of friction using either commercially available automatic transmission fluid or traction fluids would be 0.05 to 0.09. Typical fluids would be a formulated mineral oil or a synthetic cycloaliphatic hydrocarbon fluid with viscosities at 100° C. ranging from 0.0033 to 0.0065 $P_a-s$.

Although we have illustrated straight cylindrical friction roller elements, it is desirable to slightly crown the sun gear and the planet roller as well as the friction surface of the ring so that the friction surfaces measured on a plane containing the axis of the friction element would have an overall slight curvature, perhaps as much as 1 meter radius. This will eliminate the possibility of stress points occurring at the edges of the rollers or the edges of the sun gear or ring gear. In the preferred embodiment, the curvature at the friction surfaces may include cooperating concave and convex registering surfaces so as to provide axial stability of the rollers and reduce axial thrust to a minimum. Alternately, each surface may be a convex surface.

The lubricant for the friction surfaces may be retained in a sump in a housing (not shown) surrounding the friction drive illustrated in FIG. 1. The planet carrier cover 54 is adapted to accommodate radial vanes or grooves that can effect a centrifugal action or slinging of the lubricant fluid to the radially outward region of the housing cavity within which the roller elements are disposed, thereby lubricating the friction surfaces. In the alternative, a separate lubricant spray nozzle may be disposed in the upper portion of the housing that surrounds the friction drive of FIG. 1. The nozzle may be supplied with lubricant pump supplied from the sump at the lower portion of the housing cavity containing the two-speed drive. The discharge of the lubricant spray nozzle will be directed by the nozzle toward the upper portion of the ring roller.

Having described a preferred embodiment of our invention, what we claim or desire to secure by U.S. Letters Patent is:

1. A multiple ratio planetary friction drive adapted to establish plural torque flow paths between a torque input shaft and a torque output shaft comprising:

a planetary roller assembly with a sun roller element (3)), a ring roller element (26), inner and outer groups of planet rollers (84, 66) and a carrier element (50) rotatably supporting said planet rollers;

said ring roller element having an annular friction surface, said planet rollers having friction surfaces, the friction surfaces of said outer group of planet rollers being in frictional driving engagement with the friction surface of said ring roller element;

said sun roller element having a friction surface in frictional drive engagement with the friction surface of said inner group of planet rollers;

means (134, 128) for applying a tangential force to one of said groups of planet rollers, thereby establishing normal forces at the planet roller engagement locations on the frictional surfaces of said sun roller element and said ring roller element;

clutch and brake means including an overrunning coupling disposed between two of said elements of said planetary roller assembly and a brake member connected to one of said elements of said planetary roller assembly for selectively and alternately anchoring said one element to establish a torque reaction point and for clutching together two of said elements thereby establishing tow driving speed ratios between said torque input and torque output shafts.

2. The combination as set forth in claim 1 wherein said overrunning coupling is disposed between said carrier element and said sun roller element whereby said carrier element, said sun roller element and said ring roller element rotate in unison when said one element is not anchored.

3. A multiple ratio planetary friction drive adapted to establish plural torque flow paths between a torque input shaft (10) and a torque output shaft (12) comprising a planetary roller assembly with a sun roller element (30), a ring roller element (26), inner and outer groups of planet rollers (84, 66) and a carrier element (50) rotatably supporting said planet rollers;

said ring roller element having an annular friction surface, said planet rollers having friction surfaces, the friction surfaces of said outer group of planet rollers being in frictional driving engagement with the friction surface of said ring roller element;

said sun roller element having a friction surface in frictional driving engagement with the friction surface of said inner group of planet rollers;

means (134, 128) for applying a tangential force to one of said groups of planet rollers, thereby establishing normal forces at the planet roller engagement locations on the frictional surfaces of said sun roller element and said ring roller element;

clutch and brake means (104, 136) for selectively and alternately anchoring said carrier element to establish a torque reaction point and for clutching together said carrier element and said sun roller element thereby establishing two driving speed ratios between said input and output shafts, said clutch and brake means including an overrunning coupling disposed between said carrier element and said sun roller element whereby said carrier element, said sun roller element and said ring roller element rotate in unison when said carrier element is not anchored.

* * * * *

UNITED STATES PATENT AND TRADEMARK OFFICE
CERTIFICATE OF CORRECTION

PATENT NO. : 5,122,099

DATED : June 16, 1992

INVENTOR(S) : Stephen Boedo and Romas B. Spokas

It is certified that error appears in the above-identified patent and that said Letters Patent is hereby corrected as shown below:

Col. 10, Line 56,     Delete "(3))" and insert --(30)--;

Col. 11, Line 11,     Delete "tow" and insert --two--.

Signed and Sealed this

Thirty-first Day of August, 1993

Attest:

BRUCE LEHMAN

*Attesting Officer*     *Commissioner of Patents and Trademarks*